(12) United States Patent
Park et al.

(10) Patent No.: US 8,894,753 B2
(45) Date of Patent: Nov. 25, 2014

(54) CARBON DIOXIDE CAPTURE SYSTEMS

(71) Applicant: Korea Research Institute of Chemical Technology, Daejeon (KR)

(72) Inventors: Yong Ki Park, Daejeon (KR); Won Choon Choi, Daejeon (KR); Na Young Kang, Chungcheongnam-do (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 14/350,363

(22) PCT Filed: Jan. 25, 2013

(86) PCT No.: PCT/KR2013/000583
§ 371 (c)(1),
(2), (4) Date: Apr. 8, 2014

(87) PCT Pub. No.: WO2014/051221
PCT Pub. Date: Apr. 3, 2014

(65) Prior Publication Data
US 2014/0251136 A1    Sep. 11, 2014

(30) Foreign Application Priority Data
Sep. 26, 2012 (KR) .................. 10-2012-0107160

(51) Int. Cl.
*B01D 53/02* (2006.01)
*B01D 53/12* (2006.01)

(52) U.S. Cl.
CPC .................................... *B01D 53/12* (2013.01)
USPC .................. 96/123; 96/126; 96/131; 96/132; 96/133; 96/136; 96/146; 95/139

(58) Field of Classification Search
USPC .............. 95/139; 96/123, 126–128, 131–142, 96/146
See application file for complete search history.

(56) References Cited

U.S. PATENT DOCUMENTS

| | | | | |
|---|---|---|---|---|
| 3,719,573 A * | 3/1973 | Kawahata | ...................... | 204/176 |
| 3,786,135 A * | 1/1974 | Kloap et al. | .................. | 423/496 |
| 3,921,544 A * | 11/1975 | Reese | ........................... | 110/216 |
| 4,373,935 A * | 2/1983 | Ausikaitis et al. | .............. | 95/123 |
| 4,405,343 A * | 9/1983 | Othmer | ......................... | 95/105 |
| 4,574,872 A * | 3/1986 | Yano et al. | ..................... | 96/125 |
| 4,950,311 A * | 8/1990 | White, Jr. | ......................... | 95/98 |
| 5,110,323 A | 5/1992 | Soni | | |
| 5,170,633 A * | 12/1992 | Kaplan | ............................ | 62/94 |

(Continued)

FOREIGN PATENT DOCUMENTS

| | | |
|---|---|---|
| JP | 05-068833 A | 3/1993 |
| JP | 2001-137646 A | 5/2001 |

(Continued)

*Primary Examiner* — Christopher P Jones
(74) *Attorney, Agent, or Firm* — Revolution IP, PLLC

(57) ABSTRACT

Disclosed is a carbon dioxide capture system which includes a first carbon dioxide adsorption/desorption section including a first carbon dioxide adsorption section, a first carbon dioxide desorption section connected to the first carbon dioxide adsorption section, and a first carbon dioxide adsorbent circulating through the first carbon dioxide adsorption section and the first carbon dioxide desorption section; and a second carbon dioxide adsorption/desorption section including a second carbon dioxide adsorption section, a second carbon dioxide desorption section connected to the second carbon dioxide adsorption section, and a second carbon dioxide adsorbent circulating through the second carbon dioxide adsorption section and the second carbon dioxide desorption section.

17 Claims, 11 Drawing Sheets

(56) References Cited

U.S. PATENT DOCUMENTS

| | | |
|---|---|---|
| 5,676,738 A | 10/1997 | Cioffi et al. |
| 6,199,388 B1* | 3/2001 | Fischer, Jr. .................. 62/90 |
| 8,500,851 B2* | 8/2013 | Brown et al. ................ 95/108 |
| 8,764,890 B2* | 7/2014 | Yi et al. ...................... 96/134 |
| 2006/0165574 A1* | 7/2006 | Sayari ......................... 423/210 |
| 2012/0160098 A1* | 6/2012 | Papale ......................... 95/106 |

FOREIGN PATENT DOCUMENTS

| | | |
|---|---|---|
| JP | 2011-213494 A | 10/2011 |
| KR | 10-1094325 B1 | 10/1997 |
| KR | 10-2008-0095069 A | 10/2008 |
| KR | 10-1045061 B1 | 6/2011 |
| KR | 10-0912250 B1 | 12/2011 |
| KR | 10-1146710 B1 | 5/2012 |

* cited by examiner

CARBON DIOXIDE CAPTURE SYSTEMS

CROSS REFERENCE TO PRIOR APPLICATIONS

This application is a National Stage Application of PCT International Patent Application No. PCT/KR2013/000583 filed on Jan. 25, 2013, under 35 U.S.C. §371, which claims priority to Korean Patent Application No. 10-2012-0107160 filed on Sep. 26, 2012, which are all hereby incorporated by reference in their entirety.

BACKGROUND

The present invention relates to carbon dioxide capture systems, and more specifically to carbon dioxide capture systems that prevent carbon dioxide present in flue gases from industrial facilities, such as power plants and steel mills, from being exhausted into the atmosphere.

Due to recent global warming, the polar icecaps have been melting, causing a rise in the sea level. Recent changes in climate have caused unusual weather phenomena around the world. Global warming is known to be attributed to increased greenhouse gas emissions. International agreements have been signed to restrict the emission of carbon dioxide. Attempts to suppress the emission of carbon dioxide by the introduction of carbon credits become economic issues in individual countries around the world. Efforts to reduce the emission of carbon dioxide have been directed towards the development of alternative energy sources (such as solar energy and wind energy) capable of replacing fossil fuels, and techniques for the capture and storage of carbon dioxide from fossil fuels while preventing the carbon dioxide from being released into the atmosphere. The latter techniques are called carbon capture and storage (CCS) techniques and are broadly divided into techniques for capturing carbon dioxide from power plants and steel mills and techniques for storing captured carbon dioxide in the soil or ocean.

The carbon dioxide capture techniques can be divided into post-combustion capture, pre-combustion capture, and oxy-fuel capture according to stages at which carbon dioxide is captured. The carbon dioxide capture techniques can also be divided into membrane separation, liquid phase separation, and solid phase separation techniques according to the principles of carbon dioxide capture. The membrane separation techniques use separation membranes to concentrate carbon dioxide, the liquid phase separation techniques use liquid adsorbents such as amines or aqueous ammonia, and the solid phase separation techniques use solid phase adsorbents such as alkali or alkaline earth metals.

The solid phase separation techniques are largely directed towards the development of solid phase adsorbents Carbon dioxide capture efficiency is greatly affected by the design of adsorption processes as well as the performance of solid phase adsorbents. Solid phase adsorbents can be broadly classified into organic, inorganic, carbon-based, and organic-inorganic hybrid adsorbents by the kind of their constituent materials. Solid phase adsorbents can also be classified into physical adsorbents and chemical adsorbents depending on their forms adsorbed by carbon dioxide. Representative examples of such solid phase adsorbents include: amine polymer adsorbents as organic adsorbents; zeolite-based adsorbents, alkali adsorbents, and alkaline earth metal adsorbents as inorganic adsorbents; activated carbon adsorbents modified with alkali metals as carbon-based adsorbents; and MOF adsorbents and porous silica adsorbents grafted with organic materials having an amine group as organic-inorganic hybrid adsorbents. Carbon dioxide is physically adsorbed to zeolite-based and carbon-based adsorbents. Carbon dioxide is adsorbed to the other adsorbents through chemical reactions (Energy Environ. Sci. 2011, 4, 42. ChemSusChem 2009, 2, 796).

Solid phase separation includes the steps of adsorbing carbon dioxide to a target object, and desorbing and separating the adsorbed carbon dioxide from the target object. The adsorption and desorption of carbon dioxide may occur reversibly and may be induced through heat exchange or a change in external pressure. Such carbon dioxide capture processes using dry adsorbents are classified into pressure swing adsorption (PSA) processes and temperature swing adsorption (TSA) processes by the factors they use. The PSA processes use a pressure difference and the TSA processes use a temperature difference to desorb adsorbed carbon dioxide. Generally, pressure swing adsorption processes using fixed bed adsorption columns are advantageous in capturing carbon dioxide on a small scale, and an easy-to-scale-up temperature swing adsorption processes using fluidized bed adsorption and desorption columns are advantageous in capturing a large amount of carbon dioxide from power plants or large combustion furnaces.

The present invention is intended to capture a large amount of carbon dioxide in a continuous manner using solid adsorbents and is based on a temperature swing adsorption process using fluidized bed adsorption columns and fluidized bed desorption columns. The adsorption columns and desorption columns can be divided into bubbling fluidized bed columns and diluted fluidized bed columns according to the concentration of adsorbents in operating regions. Adsorbents are present at high concentrations in the bubbling fluidized bed columns and at low concentrations in the diluted fluidized bed columns. The application of such bubbling fluidized beds and diluted fluidized beds to adsorption columns and desorption columns provides four possible combinations: i) diluted fluidized bed columns-diluted fluidized bed columns, ii) diluted fluidized bed columns-bubbling fluidized bed columns, iii) bubbling fluidized bed columns-diluted fluidized bed columns, and iv) bubbling fluidized bed columns-bubbling fluidized bed columns ("Fluidization Engineering", D. Kunii and O. Levenspiel, Robert E. Krieger, 1977).

Korean Patent Publication Nos. 2005-0003767, 2010-0099929, and 2011-0054948 disclose fluidized bed processes for carbon dioxide capture that use dry solid adsorbents based on the concept of temperature swing adsorption using diluted fluidized bed adsorption columns and bubbling fluidized bed desorption columns. According to such solid phase separation processes based on the concept of temperature swing adsorption, however, a vast amount of energy of at least 2 GJ/t-$CO_2$ is consumed to desorb carbon dioxide from adsorbents. This energy consumption is a cause of increased capture cost, together with the cost of the adsorbents. Thus, it is very important to develop a technology by which carbon dioxide can be effectively desorbed from adsorbents with less energy, achieving reduced capture cost.

SUMMARY

A first object of the present invention is to provide a multi-stage carbon dioxide capture system constructed to use carbon dioxide adsorbents having different adsorption and desorption temperatures so that heat of carbon dioxide adsorption can be used for the desorption of carbon dioxide.

A second object of the present invention is to provide a carbon dioxide capture system constructed to use heat generated from carbon dioxide adsorption for the desorption of the adsorbed carbon dioxide so that the amount of energy consumed to capture carbon dioxide can be reduced.

A third object of the present invention is to provide a carbon dioxide capture system constructed to use adsorbents having low carbon dioxide adsorption and desorption rates, achieving efficient heat exchange.

A fourth object of the present invention is to provide a carbon dioxide capture system constructed to use adsorbents having a low carbon dioxide adsorption rate and a high carbon dioxide desorption rate, achieving efficient heat exchange.

A fifth object of the present invention is to provide a carbon dioxide capture system constructed to use adsorbents having a high carbon dioxide adsorption rate and a low carbon dioxide desorption rate, achieving efficient heat exchange.

A sixth object of the present invention is to provide a carbon dioxide capture system constructed to use adsorbents having high carbon dioxide adsorption and desorption rates, achieving efficient heat exchange.

A seventh object of the present invention is to provide a carbon dioxide capture method using carbon dioxide adsorbents having different carbon dioxide adsorption and desorption temperatures to achieve improved process efficiency.

In order to achieve the first object of the present invention, there is provided a carbon dioxide capture system for selective separation of carbon dioxide from flue gases, including: a first carbon dioxide adsorption/desorption section including a first carbon dioxide adsorption section, a first carbon dioxide desorption section connected to the first carbon dioxide adsorption section, and a first carbon dioxide adsorbent circulating through the first carbon dioxide adsorption section and the first carbon dioxide desorption section; and a second carbon dioxide adsorption/desorption section including a second carbon dioxide adsorption section, a second carbon dioxide desorption section connected to the second carbon dioxide adsorption section, and a second carbon dioxide adsorbent circulating through the second carbon dioxide adsorption section and the second carbon dioxide desorption section, wherein the first carbon dioxide adsorbent has higher adsorption and desorption temperatures than the second carbon dioxide adsorbent, the first carbon dioxide adsorption section is connected to the second carbon dioxide desorption section, and adsorption heat generated from the first carbon dioxide adsorption section is transferred to the second carbon dioxide desorption section and is used for the desorption of carbon dioxide.

According to one embodiment of the present invention, the first carbon dioxide adsorption section may be connected to the second carbon dioxide desorption section in such a manner that the first carbon dioxide adsorption section penetrates the second carbon dioxide desorption section or the second carbon dioxide desorption section penetrates the first carbon dioxide adsorption section.

According to a further embodiment of the present invention, the first carbon dioxide adsorption section may be connected to the second carbon dioxide desorption section through a heat transfer medium.

According to another embodiment of the present invention, the first carbon dioxide desorption section is preferably designed such that the first carbon dioxide desorption section is filled with 0.1 to 10% by volume of the first carbon dioxide adsorbent.

According to another embodiment of the present invention, the first carbon dioxide desorption section is preferably designed such that the first carbon dioxide desorption section is filled with 10 to 80% by volume of the first carbon dioxide adsorbent.

According to another embodiment of the present invention, the second carbon dioxide adsorption section is preferably designed such that the second carbon dioxide adsorption section is filled with 0.1 to 10% by volume of the second carbon dioxide adsorbent.

According to another embodiment of the present invention, the second carbon dioxide adsorption section is preferably designed such that the second carbon dioxide adsorption section is filled with 10 to 80% by volume of the second carbon dioxide adsorbent.

In order to achieve the second object of the present invention, there is provided a carbon dioxide capture system for selective separation of carbon dioxide from flue gases, including a plurality of carbon dioxide adsorption/desorption sections in which carbon dioxide adsorbents are filled and carbon dioxide is continuously adsorbed and desorbed while the carbon dioxide adsorbents circulate through carbon dioxide adsorption and desorption regions, wherein the carbon dioxide adsorbent filled in at least one of the carbon dioxide adsorption/desorption sections has higher carbon dioxide adsorption and desorption temperatures than the carbon dioxide adsorbent filled in the adjacent adsorption/desorption section, and adsorption heat generated from the adsorption region of the carbon dioxide adsorption/desorption section filled with the carbon dioxide adsorbent having higher carbon dioxide adsorption and desorption temperatures is transferred to the desorption region of the adsorption/desorption section filled with the carbon dioxide adsorbent having lower carbon dioxide adsorption and desorption temperatures and is used for the desorption of carbon dioxide.

According to one embodiment of the present invention, adsorption heat generated from the adsorption region of the carbon dioxide adsorption/desorption section filled with the carbon dioxide adsorbent having higher carbon dioxide adsorption and desorption temperatures may be transferred to the desorption region of the adsorption/desorption section filled with the carbon dioxide adsorbent having lower carbon dioxide adsorption and desorption temperatures in such a manner that the carbon dioxide adsorption region comes into direct contact with the carbon dioxide desorption region.

According to a further embodiment of the present invention, adsorption heat generated from the adsorption region of the carbon dioxide adsorption/desorption sections filled with the carbon dioxide adsorbent having higher carbon dioxide adsorption and desorption temperatures may be transferred to the desorption region of the adsorption/desorption section filled with the carbon dioxide adsorbent having lower carbon dioxide adsorption and desorption temperatures through a heat transfer medium.

According to another embodiment of the present invention, adsorption heat generated from the adsorption region of the carbon dioxide adsorption/desorption section filled with the carbon dioxide adsorbent having higher carbon dioxide adsorption and desorption temperatures may be transferred to the desorption region of the adsorption/desorption section filled with the carbon dioxide adsorbent having lower carbon dioxide adsorption and desorption temperatures through a heat exchanger.

According to another embodiment of the present invention, the plurality of carbon dioxide adsorption/desorption sections are divided into a high temperature carbon dioxide adsorption/desorption section, an intermediate temperature carbon dioxide adsorption/desorption section, and a low temperature carbon dioxide adsorption/desorption section; adsorption heat generated from a carbon dioxide adsorption region of the high temperature carbon dioxide adsorption/desorption section may be transferred to a carbon dioxide desorption region of the intermediate temperature carbon dioxide adsorption/desorption section; and adsorption heat generated from a carbon dioxide adsorption region of the intermediate temperature carbon dioxide adsorption/desorption section may be transferred to a carbon dioxide desorption region of the low temperature carbon dioxide adsorption/desorption section.

In order to achieve the third object of the present invention, there is provided a carbon dioxide capture system including a plurality of carbon dioxide adsorption/desorption sections, each of which includes: a bubbling fluidized bed adsorption column in which a carbon dioxide adsorbent is moved from the top to the bottom; a bubbling fluidized bed desorption column in which a carbon dioxide adsorbent is moved from the top to the bottom; a first connection line connecting the bottom of the bubbling fluidized bed adsorption column to the top of the bubbling fluidized bed desorption column; a second connection line connecting the bottom of the bubbling fluidized bed desorption column to the top of the bubbling fluidized bed adsorption column; and a cyclone disposed between the second connection line and the bubbling fluidized bed adsorption column, wherein at least one of the plurality of carbon dioxide adsorption/desorption sections is constructed such that heat is exchangeable.

In order to achieve the fourth object of the present invention, there is provided a carbon dioxide capture system including a plurality of carbon dioxide adsorption/desorption sections, each of which includes: a bubbling fluidized bed adsorption column in which a carbon dioxide adsorbent is moved from the top to the bottom; a diluted fluidized bed desorption column in which a carbon dioxide adsorbent is moved from the bottom to the top; and a cyclone disposed between the bubbling fluidized bed adsorption column and the diluted fluidized bed desorption column, wherein at least one of the plurality of carbon dioxide adsorption/desorption sections is constructed such that heat is exchangeable.

In order to achieve the fifth object of the present invention, there is provided a carbon dioxide capture system including a plurality of carbon dioxide adsorption/desorption sections, each of which includes: a diluted fluidized bed adsorption column in which a carbon dioxide adsorbent is moved from the bottom to the top; a bubbling fluidized bed desorption column in which a carbon dioxide adsorbent is moved from the top to the bottom; and a cyclone disposed between the diluted fluidized bed adsorption column and the bubbling fluidized bed desorption column, wherein at least one of the plurality of carbon dioxide adsorption/desorption sections is constructed such that heat is exchangeable.

In order to achieve the sixth object of the present invention, there is provided a carbon dioxide capture system including a plurality of carbon dioxide adsorption/desorption sections, each of which includes: a diluted fluidized bed adsorption column in which a carbon dioxide adsorbent is moved from the bottom to the top; a diluted fluidized bed desorption column in which a carbon dioxide adsorbent is moved from the bottom to the top; two storage columns connecting the diluted fluidized bed adsorption column to the diluted fluidized bed desorption column; a cyclone disposed between the diluted fluidized bed adsorption column and one of the storage columns; and a cyclone disposed between the diluted fluidized bed desorption column and the other storage column, wherein at least one of the plurality of carbon dioxide adsorption/desorption sections is constructed such that heat is exchangeable.

In order to achieve the seventh object of the present invention, there is provided a carbon dioxide capture method for selective separation of carbon dioxide from flue gases wherein carbon dioxide is adsorbed and desorbed in a plurality of carbon dioxide adsorption/desorption sections, carbon dioxide is continuously adsorbed and desorbed while the carbon dioxide adsorbents circulate through carbon dioxide adsorption and desorption regions of the carbon dioxide adsorption/desorption sections, the carbon dioxide adsorbent filled in at least one of the carbon dioxide adsorption/desorption sections has higher carbon dioxide adsorption and desorption temperatures than the carbon dioxide adsorbent filled in the adjacent adsorption/desorption section, and adsorption heat generated from the adsorption region of the carbon dioxide adsorption/desorption section filled with the carbon dioxide adsorbent having higher carbon dioxide adsorption and desorption temperatures is transferred to the desorption region of the adsorption/desorption section filled with the carbon dioxide adsorbent having lower carbon dioxide adsorption and desorption temperatures and is used for the desorption of carbon dioxide.

The carbon dioxide capture systems according to the embodiments of the present invention have the following advantageous effects.

1. The carbon dioxide capture system according to one embodiment of the present invention includes a plurality of carbon dioxide adsorption/desorption sections and is constructed such that one of the adsorption/desorption sections generates adsorption heat and the adjacent adsorption/desorption section receives and uses the adsorption heat for the desorption of carbon dioxide. This construction can save energy necessary for the adsorption and desorption of carbon dioxide.

2. The carbon dioxide capture system according to one embodiment of the present invention is constructed to use carbon dioxide adsorbents having different carbon dioxide adsorption and desorption temperatures. Due to this construction, heat of carbon dioxide adsorption can be used for the desorption of carbon dioxide, achieving efficient energy transfer.

3. The carbon dioxide capture system according to one embodiment of the present invention is designed to selectively use diluted fluidized bed or bubbling fluidized bed carbon dioxide adsorption sections and diluted fluidized bed or bubbling fluidized bed carbon dioxide desorption sections in a plurality of carbon dioxide adsorption/desorption sections connected to each other. Due to this design, the carbon dioxide capture system can be efficiently operated depending on the characteristics of adsorbents regarding carbon dioxide adsorption and desorption rates.

4. The carbon dioxide capture system according to one embodiment of the present invention is constructed such that heat of carbon dioxide adsorption is directly transferred. This construction can prevent heat loss during transfer of the adsorption heat.

5. The carbon dioxide capture system according to one embodiment of the present invention is constructed such that heat of carbon dioxide adsorption is transferred using a heat transfer medium. This simplifies the construction of the system and is advantageous in scaling up the system.

DETAILED DESCRIPTION

The present invention will now be described in detail.

One embodiment of the present invention provides a carbon dioxide capture system including: a first carbon dioxide adsorption/desorption section including a first carbon dioxide adsorption section, a first carbon dioxide desorption section connected to the first carbon dioxide adsorption section, and a first carbon dioxide adsorbent circulating through the first carbon dioxide adsorption section and the first carbon dioxide desorption section; and a second carbon dioxide adsorption/desorption section including a second carbon dioxide adsorption section, a second carbon dioxide desorption section connected to the second carbon dioxide adsorption section, and a second carbon dioxide adsorbent circulating through the second carbon dioxide adsorption section and the second carbon dioxide desorption section, wherein the first carbon dioxide adsorption section is connected to the second carbon dioxide desorption section such that adsorption heat generated from the first carbon dioxide adsorption section is transferred to the second carbon dioxide desorption section, and the first carbon dioxide adsorbent has different adsorption and desorption temperatures from the second carbon dioxide adsorbent.

The present invention is intended to capture a large amount of carbon dioxide in a continuous manner using solid adsorbents and is based on a temperature swing adsorption process using fluidized bed adsorption columns and fluidized bed desorption columns.

Figure 1:
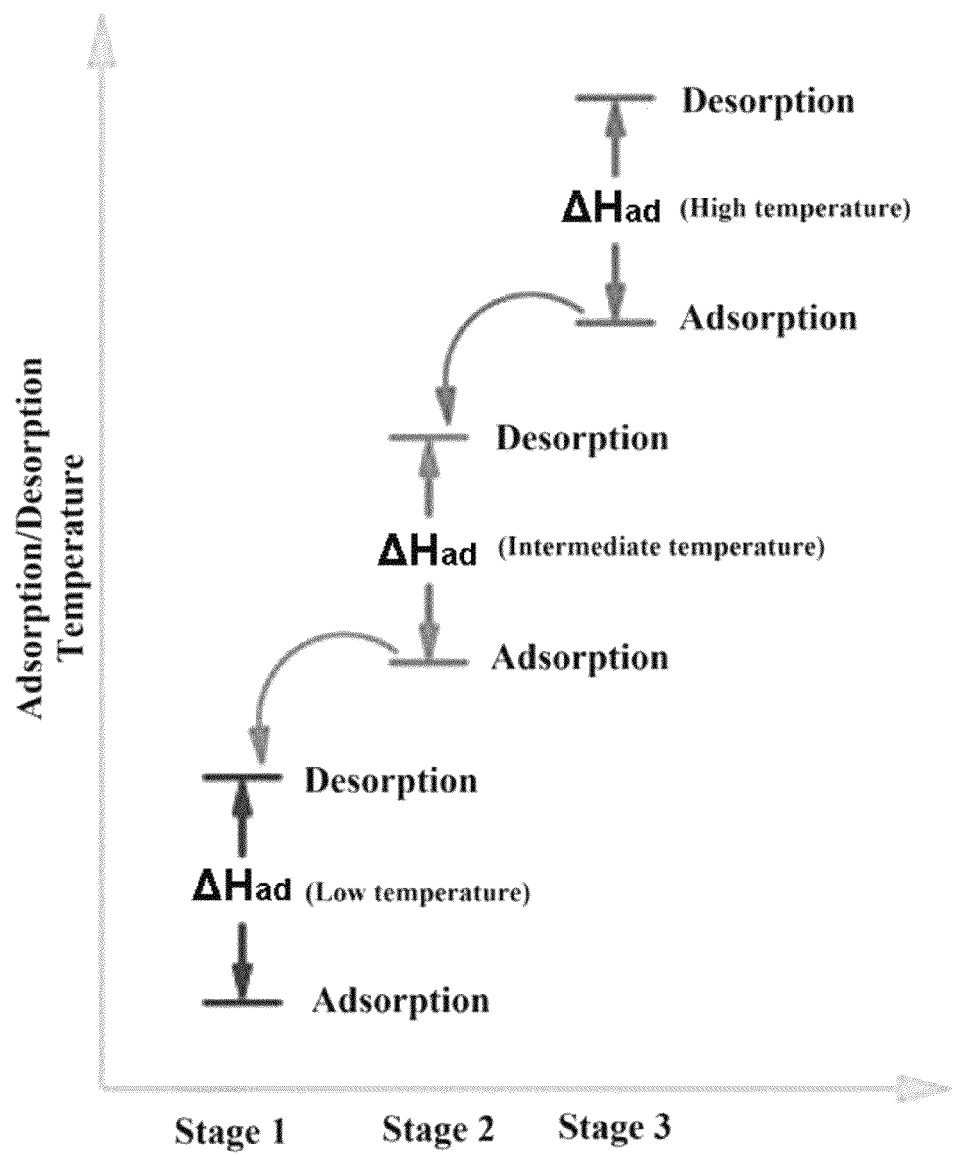
FIG. 1 is a diagram for explaining the concept of using heat of carbon dioxide adsorption as heat necessary for the desorption of carbon dioxide in a carbon dioxide adsorption-desorption cycle consisting of a low temperature region, an intermediate temperature region, and high temperature region in accordance with one embodiment of the present invention.

FIG. 1 is a diagram for explaining the concept of using heat of carbon dioxide adsorption as heat necessary for the desorption of carbon dioxide in a carbon dioxide adsorption-desorption cycle consisting of a low temperature region, an intermediate temperature region, and high temperature region in accordance with one embodiment of the present invention. Referring to FIG. 1, carbon dioxide adsorption/desorption sections in which carbon dioxide is adsorbed and desorbed at different temperatures are multi-stage connected. This connection enables the transfer of energy between the carbon dioxide adsorption/desorption sections where carbon dioxide is adsorbed and desorbed. That is, adsorbents having different adsorption and desorption temperatures are filled in the high temperature, intermediate temperature, and low temperature carbon dioxide adsorption/desorption sections, adsorption heat is generated in the course of desorbing adsorbed carbon dioxide and is transferred to the adjacent region to induce the desorption of carbon dioxide or reduce the amount of heat necessary for desorption. Specifically, adsorption heat is emitted when the adsorbent adsorbs carbon dioxide in the high temperature region and is used as energy necessary for the adsorbent in the intermediate temperature region to desorb the carbon dioxide, and adsorption heat is emitted when the adsorbent adsorbs carbon dioxide in the intermediate temperature region and is used as energy necessary for the adsorbent in the low temperature region to desorb the carbon dioxide. The use of energy generated during adsorption of carbon dioxide as energy necessary for the desorption of carbon dioxide can reduce the cost of energy consumed to desorb the carbon dioxide.

According to embodiments of the present invention, carbon dioxide capture systems may be designed to have various constructions. First, the carbon dioxide capture systems may be constructed to include bubbling fluidized bed or diluted fluidized bed carbon dioxide adsorption sections and bubbling fluidized bed or diluted fluidized bed desorption sections. That is, the following four possible combinations are possible: i) bubbling fluidized bed adsorption sections-bubbling fluidized bed adsorption sections, ii) bubbling fluidized bed adsorption sections-diluted fluidized bed desorption sections, iii) diluted fluidized bed adsorption sections-bubbling fluidized bed desorption sections, and iv) diluted fluidized bed adsorption sections-diluted fluidized bed desorption sections. Each of the bubbling fluidized bed adsorption sections or desorption sections is designed such that it is preferably filled with an adsorbent at a concentration of 10 to 80% by volume, more preferably 30 to 60% by volume. Each of the diluted fluidized bed adsorption sections or desorption sections is designed such that it is preferably filled with an adsorbent at a concentration of 0.1 to 10% by volume, more preferably 0.5 to 5% by volume. The carbon dioxide capture systems are required to have constructions specially designed to use heat of carbon dioxide adsorption for the desorption of carbon dioxide.

Methods for transferring heat of carbon dioxide adsorption to the adjacent carbon dioxide desorption section may also be modified. One of the modified methods is to exchange heat in a state in which the carbon dioxide adsorption section is in direct contact with the carbon dioxide desorption section. Another modified method is to exchange heat using a heat transfer medium.

As described earlier, the embodiments of the present invention are broadly classified into 8 modes by the constructions and heat transfer modes of the carbon dioxide adsorption sections and desorption sections, which are summarized in Table 1.

tion 102 and is released through the cyclone 104. After desorption, the adsorbent is transferred from the bottom of the bubbling fluidized bed carbon dioxide desorption section 102

TABLE 1

| Heat exchange mode | (Desorption section)-(Adsorption section) combinations | | | |
|---|---|---|---|---|
| Direct mode (without heat transfer medium) | (Bubbling fluidized bed)-(Bubbling fluidized bed) | (Bubbling fluidized bed)-(Diluted fluidized bed) | (Diluted fluidized bed)-(Bubbling fluidized bed) | (Diluted fluidized bed)-(Diluted fluidized bed) |
| Indirect mode (using heat transfer medium) | (Bubbling fluidized bed)-(Bubbling fluidized bed) | (Bubbling fluidized bed)-(Diluted fluidized bed) | (Diluted fluidized bed)-(Bubbling fluidized bed) | (Diluted fluidized bed)-(Diluted fluidized bed) |

Hereinafter, the main constructions and operations of the carbon dioxide capture systems will be described with reference to FIGS. 2 to 6.

Figure 2:
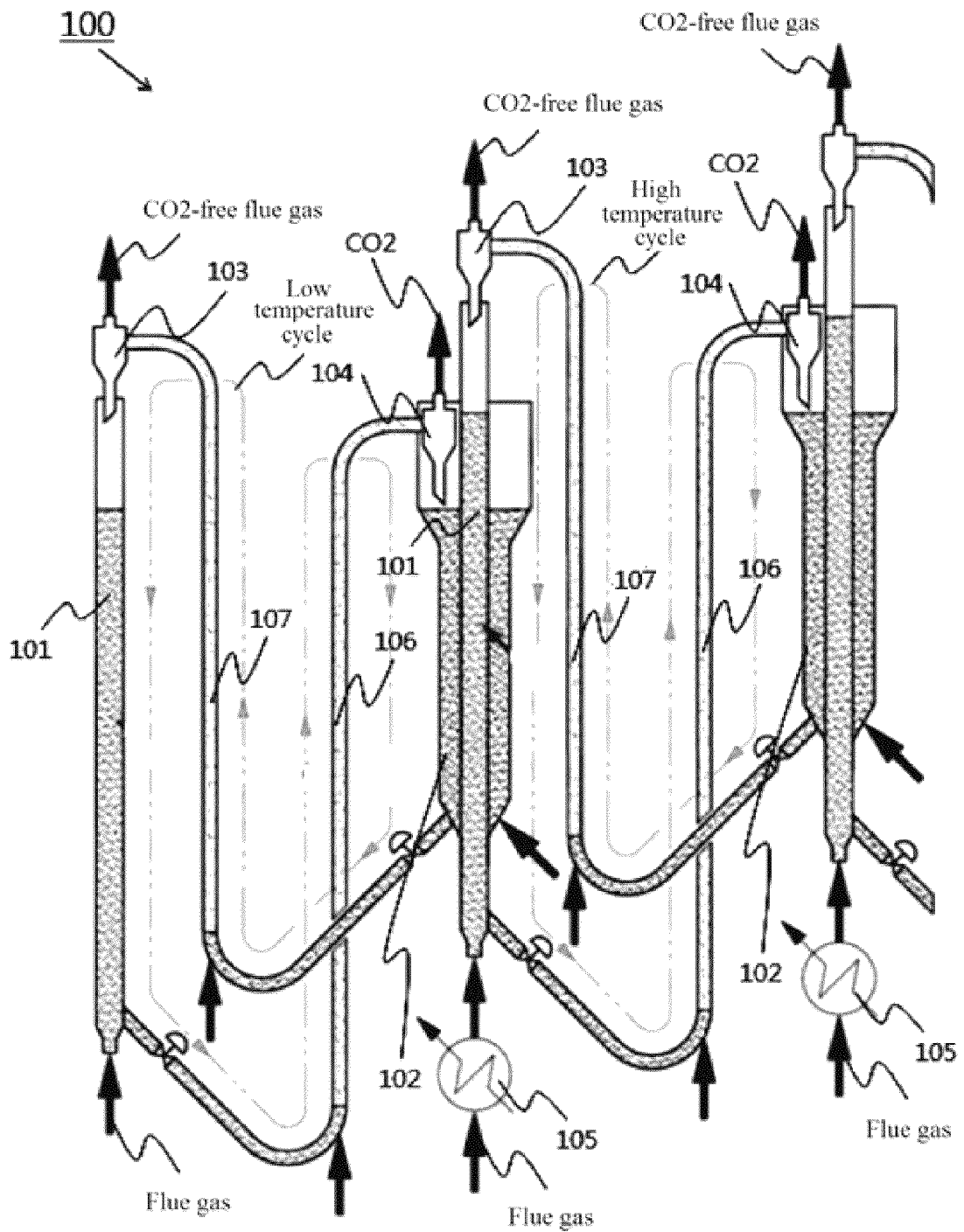
FIG. 2 illustrates main parts of a carbon dioxide capture system including bubbling fluidized bed adsorption columns and bubbling fluidized bed desorption columns according to one embodiment of the present invention.

FIG. 2 illustrates main parts of a carbon dioxide capture system including bubbling fluidized bed adsorption columns and bubbling fluidized bed desorption columns according to one embodiment of the present invention. The carbon dioxide capture system includes carbon dioxide adsorption/desorption sections, which may be connected in three stages, i.e. low, intermediate, and high temperature stages. An adsorbent in the intermediate temperature region generates heat by adsorption of carbon dioxide. This heat is transferred to the low temperature region by direct heat exchange through the wall of the reactor and is used as energy necessary for the desorption of carbon dioxide in the low temperature region. An adsorbent in the high temperature region generates heat by adsorption of carbon dioxide. This heat is transferred to the intermediate temperature region by direct heat exchange through the wall of the reactor and is used as energy necessary for the desorption of carbon dioxide in the intermediate temperature region. That is, adsorption heat generated during adsorption of carbon dioxide in the higher temperature region is sequentially transferred to the lower temperature region where the adsorption heat is used as energy necessary for the desorption of the adsorbed carbon dioxide. Referring to FIG. 2, each of the carbon dioxide adsorption/desorption section in the low temperature cycle region and the carbon dioxide adsorption/desorption section in the high temperature cycle region of the bubbling fluidized bed-bubbling fluidized bed carbon dioxide capture system 100 includes a bubbling fluidized bed carbon dioxide adsorption section 101, a bubbling fluidized bed carbon dioxide desorption section 102, cyclones 103 and 104, a heat exchanger 105, a first transfer line 106, and a second transfer line 107. The carbon dioxide adsorption/desorption section in the low temperature cycle region is filled with a carbon dioxide adsorbent having relatively low carbon dioxide adsorption and desorption temperatures, and the carbon dioxide adsorption/desorption section in the high temperature cycle region is filled with a carbon dioxide adsorbent having relatively high carbon dioxide adsorption and desorption temperatures. A flue gas containing carbon dioxide is supplied to the bottom of each bubbling fluidized bed carbon dioxide adsorption section 101, and the flue gas free from carbon dioxide is released through the cyclone 103 disposed on the top of the bubbling fluidized bed carbon dioxide adsorption section 101. Carbon dioxide is adsorbed to the carbon dioxide adsorbent in the bubbling fluidized bed carbon dioxide adsorption section 101. After adsorption, the carbon dioxide adsorbent is moved in the direction from the top to the bottom in the bubbling fluidized bed carbon dioxide adsorption section 101 and is supplied to the top of the bubbling fluidized bed carbon dioxide desorption section 102 through the first transfer line 106. Carbon dioxide is desorbed in the bubbling fluidized bed carbon dioxide desorption secto the top of the bubbling fluidized bed carbon dioxide adsorption section 101 through the second transfer line 107. As this cycle is repeated, carbon dioxide can be captured from the flue gases and released to the outside. The carbon dioxide adsorption section and the carbon dioxide desorption section are connected adjacent to each other and are arranged such that heat is exchangeable therebetween. The figure illustrates that the carbon dioxide adsorption section is arranged so as to penetrate the carbon dioxide desorption section. However, any arrangement is also possible so long as heat can be directly exchanged between the adsorption section and the desorption section. For example, the adsorption section may be connected to the desorption section through a wall.

Cooling means may be placed in the bubbling fluidized bed carbon dioxide adsorption section 101 and heating means may be placed in the bubbling fluidized bed carbon dioxide desorption section 102. The carbon dioxide adsorbent entering the bubbling fluidized bed carbon dioxide adsorption section 101 may be precooled and the carbon dioxide adsorbent entering the bubbling fluidized bed carbon dioxide desorption section 102 may be preheated. For the precooling and preheating, the heat exchanger 105 may be used. Although not illustrated in the figure, at least one heat exchanger may be further installed at a necessary location. Although not illustrated in the figure, at least one compressor or blower may be provided to move the carbon dioxide adsorbent, if needed.

The carbon dioxide capture system including the bubbling fluidized bed adsorption sections and the bubbling fluidized bed desorption sections is constructed to sufficiently maintain the retention of the adsorbents in the adsorption sections and the desorption sections for a time necessary to adsorb and desorb carbon dioxide. The transfer lines are used for sufficient retention of the adsorbents. This construction is advantageous when the adsorbents for carbon dioxide capture have low adsorption and desorption rates.

Figure 3:
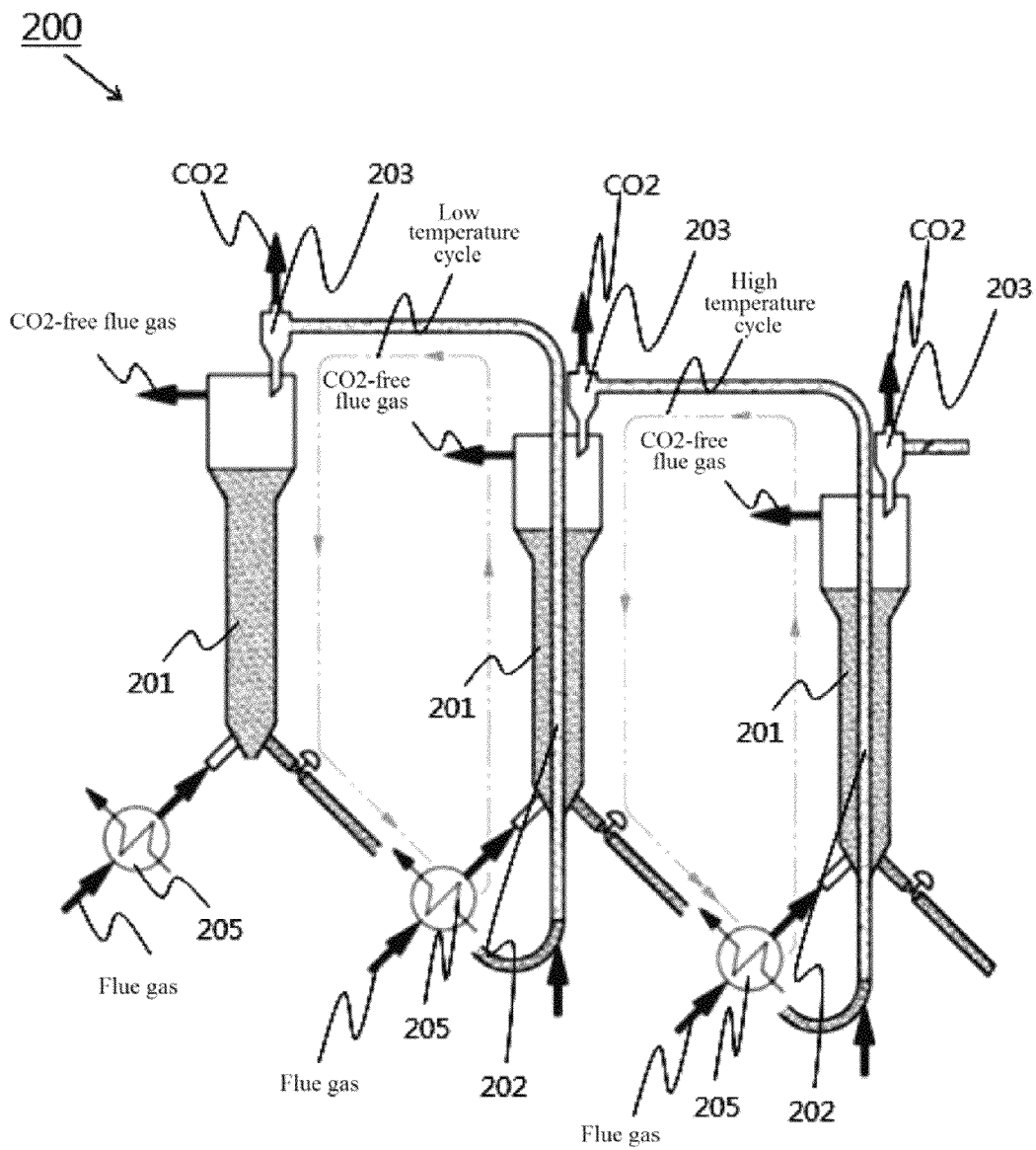
FIG. 3 illustrates main parts of a carbon dioxide capture system including bubbling fluidized bed adsorption columns and diluted fluidized bed desorption columns according to one embodiment of the present invention.

FIG. 3 illustrates main parts of a carbon dioxide capture system including bubbling fluidized bed adsorption columns and diluted fluidized bed desorption columns according to one embodiment of the present invention. The carbon dioxide capture system includes carbon adsorption/desorption sections, which may be connected in three stages, i.e. low, intermediate, and high temperature stages. Due to this connection, heat of carbon dioxide adsorption may be transferred from the high temperature region to the intermediate temperature region and from the intermediate temperature region to the low temperature region. Referring to FIG. 3, each of the carbon dioxide adsorption/desorption section in the low temperature cycle region and the carbon dioxide adsorption/desorption section in the high temperature cycle region of the bubbling fluidized bed-diluted fluidized bed carbon dioxide capture system 200 includes a bubbling fluidized bed carbon dioxide adsorption section 201, a diluted fluidized bed carbon dioxide desorption section 202, a cyclone 203, and a heat exchanger 205. A flue gas containing carbon dioxide is supplied to the bottom of each bubbling fluidized bed carbon dioxide adsorption section 201, and the flue gas free from carbon dioxide is released from the top of the bubbling fluidized bed carbon dioxide adsorption section 201. Carbon dioxide is adsorbed to a carbon dioxide adsorbent in the bubbling fluidized bed carbon dioxide adsorption section 201. After adsorption, the carbon dioxide adsorbent is moved in the direction from the top to the bottom in the bubbling fluidized bed carbon dioxide adsorption section 201 and is supplied to the bottom of the diluted fluidized bed carbon dioxide desorption section 202. While the carbon dioxide adsorbent entering the diluted fluidized bed carbon dioxide desorption section 202 is moved from the bottom to the top, carbon dioxide is desorbed from the carbon dioxide adsorbent. The desorbed carbon dioxide is released through the cyclone 203 and the carbon dioxide adsorbent is again supplied to the top of the bubbling fluidized bed carbon dioxide adsorption section 201. The carbon dioxide adsorption section and the carbon dioxide desorption section are connected adjacent to each other and are arranged such that heat is exchangeable therebetween. The fluidized bed carbon dioxide desorption section 202 is arranged so as to penetrate the bubbling fluidized bed carbon dioxide adsorption section 201 and heat is exchanged through the wall. In this embodiment as well, any arrangement is also possible so long as heat can be directly exchanged between the adsorption section and the desorption section. For example, the adsorption section may be connected to the desorption section through a wall. Cooling means may be placed in the bubbling fluidized bed carbon dioxide adsorption section 201 and heating means may be placed in the diluted fluidized bed carbon dioxide desorption section 202. Preheating or precooling means may be further provided to preheat or precool the carbon dioxide adsorbent. At least one compressor or blower may be further provided to move the carbon dioxide adsorbent.

The carbon dioxide capture system including the bubbling fluidized bed adsorption sections and the diluted fluidized bed desorption sections is constructed to sufficiently maintain the retention of the adsorbents in the adsorption sections for a time necessary to adsorb carbon dioxide. The retention time of the adsorbents in the carbon dioxide desorption sections may be determined depending on the operating conditions of the system. This construction is advantageous when the adsorbents have a low carbon dioxide adsorption rate and a high carbon dioxide desorption rate.

Figure 4:
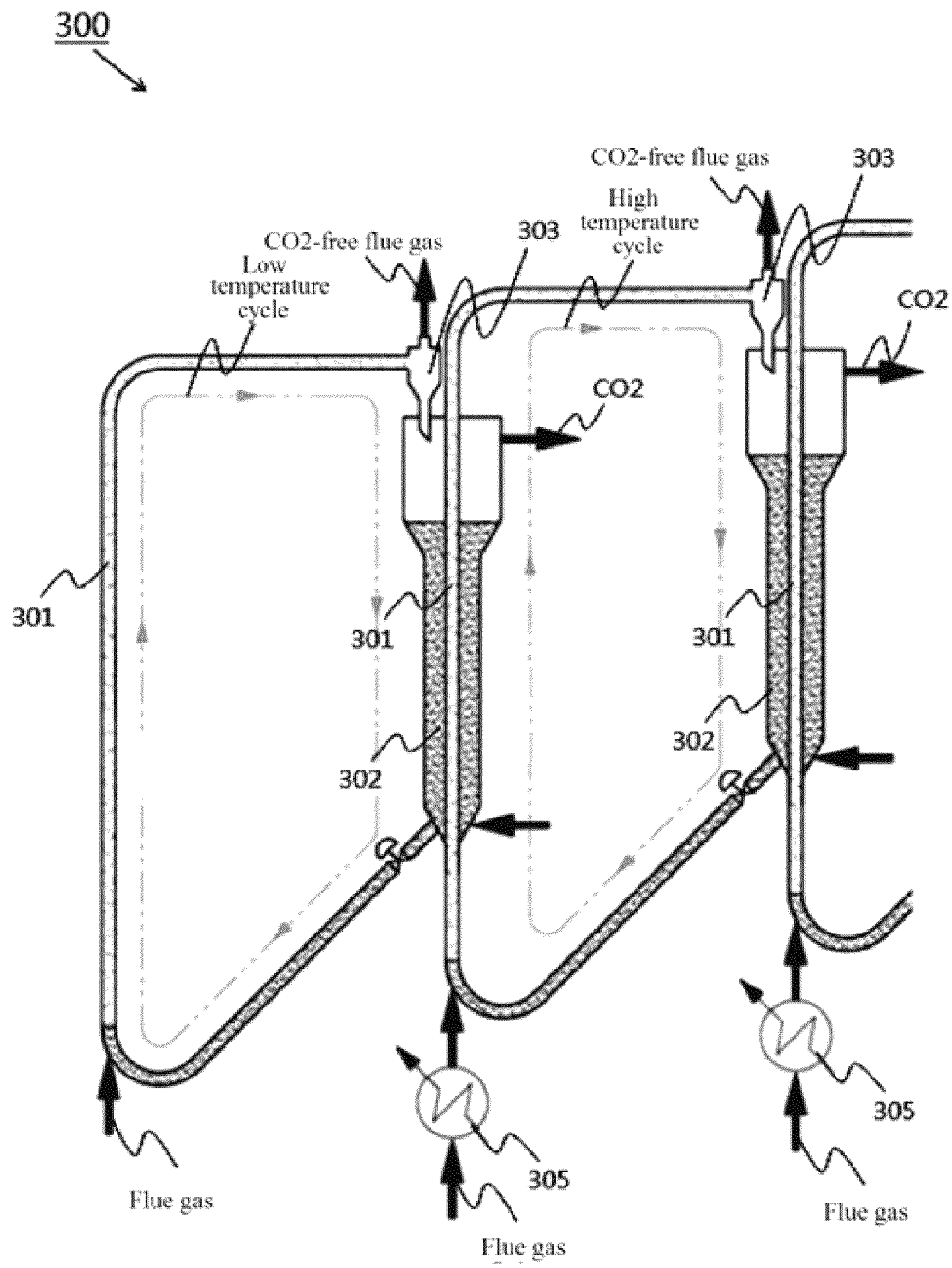
FIG. 4 illustrates main parts of a carbon dioxide capture system including diluted fluidized bed adsorption columns and bubbling fluidized bed desorption columns according to one embodiment of the present invention.

FIG. 4 illustrates main parts of a carbon dioxide capture system including diluted fluidized bed adsorption columns and bubbling fluidized bed desorption columns according to one embodiment of the present invention. The carbon dioxide capture system includes carbon dioxide adsorption/desorption sections, which may be connected in three stages, i.e. low, intermediate, and high temperature stages. Due to this connection, heat of carbon dioxide adsorption may be transferred from the high temperature region to the intermediate temperature region and from the intermediate temperature region to the low temperature region. Referring to FIG. 4, each of the carbon dioxide adsorption/desorption section in the low temperature cycle region and the carbon dioxide adsorption/desorption section in the high temperature cycle region of the diluted fluidized bed-bubbling fluidized bed carbon dioxide capture system 300 includes a diluted fluidized bed carbon dioxide adsorption section 301, a bubbling fluidized bed carbon dioxide desorption section 302, a cyclone 303, and a heat exchanger 305. A flue gas containing carbon dioxide is supplied to the bottom of each diluted fluidized bed carbon dioxide adsorption section 301, and the flue gas free from carbon dioxide is released through the cyclone 303 disposed on the diluted fluidized bed carbon dioxide adsorption section 301. Carbon dioxide is adsorbed to a carbon dioxide adsorbent in the diluted fluidized bed carbon dioxide adsorption section 301. After adsorption, the carbon dioxide adsorbent is moved in the direction from the bottom to the top in the diluted fluidized bed carbon dioxide adsorption section 301 and is supplied to the top of the bubbling fluidized bed carbon dioxide desorption section 302. While the carbon dioxide adsorbent entering the bubbling fluidized bed carbon dioxide desorption section 302 is moved in the direction from the top to the bottom, carbon dioxide is desorbed from the carbon dioxide adsorbent. The carbon dioxide adsorption section and the carbon dioxide desorption section are connected adjacent to each other and are arranged such that heat is exchangeable therebetween. The diluted fluidized bed carbon dioxide adsorption section 301 is arranged so as to penetrate the bubbling fluidized bed carbon dioxide desorption section 302 and heat is exchanged through the wall. In this embodiment as well, any arrangement is also possible so long as heat can be directly exchanged between the adsorption section and the desorption section. For example, the adsorption section may be connected to the desorption section through a wall. Cooling means may be placed in the diluted fluidized bed carbon dioxide adsorption section 301 and heating means may be placed in the bubbling fluidized bed carbon dioxide desorption section 302. Preheating or precooling means may be further provided to preheat or precool the carbon dioxide adsorbent. At least one compressor or blower may be further provided to move the carbon dioxide adsorbent.

The retention time of the adsorbents in the carbon dioxide desorption sections of the carbon dioxide capture system may be determined depending on the operating conditions of the system. This construction is advantageous when the adsorbents have a high carbon dioxide adsorption rate and a low carbon dioxide desorption rate.

Figure 5:
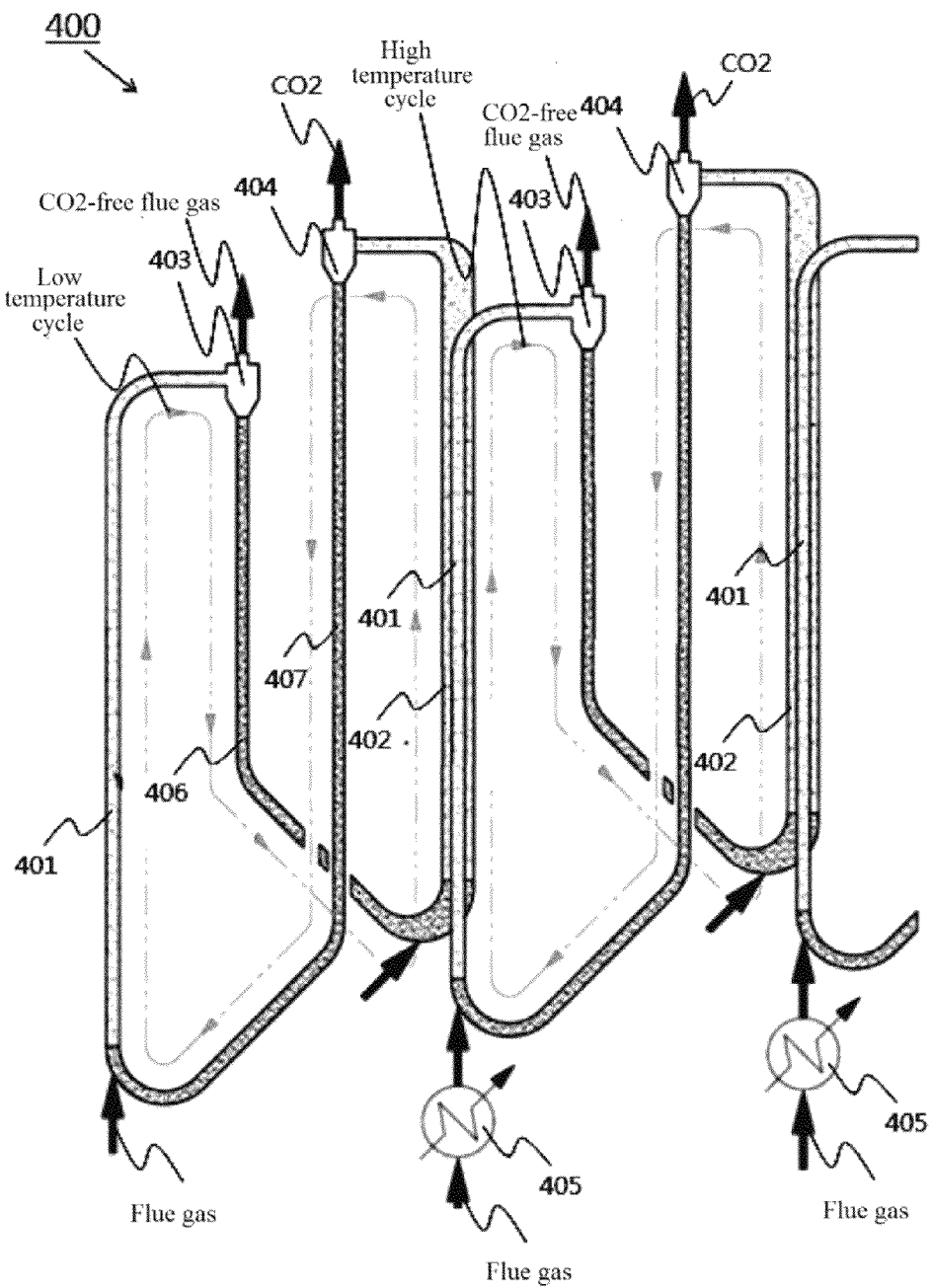
FIG. 5 illustrates main parts of a carbon dioxide capture system including diluted fluidized bed adsorption columns and diluted fluidized bed desorption columns according to one embodiment of the present invention.

FIG. 5 illustrates main parts of a carbon dioxide capture system including diluted fluidized bed adsorption columns and diluted fluidized bed desorption columns according to one embodiment of the present invention. The carbon dioxide capture system includes carbon dioxide adsorption/desorption sections, which may be connected in three stages, i.e. low, intermediate, and high temperature stages. Due to this connection, heat of carbon dioxide adsorption may be transferred from the high temperature region to the intermediate temperature region and from the intermediate temperature region to the low temperature region. Referring to FIG. 5, each of the carbon dioxide adsorption/desorption section in the low temperature cycle region and the carbon dioxide adsorption/desorption section in the high temperature cycle region of the diluted fluidized bed-diluted fluidized bed carbon dioxide capture system 400 includes a diluted fluidized bed carbon dioxide adsorption section 401, a diluted fluidized bed carbon dioxide desorption section 402, cyclones 403 and 404, a heat exchanger 405, and storage columns 406 and 407. A flue gas containing carbon dioxide is supplied to the bottom of each diluted fluidized bed carbon dioxide adsorption section 401, and the flue gas free from carbon dioxide is released through the cyclone 403 disposed on the diluted fluidized bed carbon dioxide adsorption section 401. Carbon dioxide is adsorbed to a carbon dioxide adsorbent in the diluted fluidized bed carbon dioxide adsorption section 401. After adsorption, the carbon dioxide adsorbent is moved in the direction the bottom to the top in the diluted fluidized bed carbon dioxide adsorption section 401 and is subsequently supplied to the top of the storage column 406 and the bottom of the diluted fluidized bed carbon dioxide desorption section 402.

While the carbon dioxide adsorbent entering the diluted fluidized bed carbon dioxide desorption section 402 is moved in the direction from the bottom to the top, carbon dioxide is desorbed from the carbon dioxide adsorbent and is released through the cyclone 404. Thereafter, the carbon dioxide adsorbent is supplied to the bottom of the diluted fluidized bed carbon dioxide adsorption section 401 through the storage column 407. Since the carbon dioxide adsorbents are moved in the direction from the bottom to the top in both the adsorption section and the desorption section, spaces are required to accommodate the adsorbents separated from the cyclones. The storage columns 406 and 407 function as means for accommodating the adsorbents. The carbon dioxide adsorption section and the carbon dioxide desorption section are connected adjacent to each other and are arranged such that heat is exchangeable therebetween. The diluted fluidized bed carbon dioxide adsorption section 401 is arranged so as to penetrate the diluted fluidized bed carbon dioxide desorption section 402 and heat is exchanged through the wall. In this embodiment as well, any arrangement is also possible so long as heat can be directly exchanged between the adsorption section and the desorption section. For example, the adsorption section may be connected to the desorption section through a wall. Cooling means may be placed in the diluted fluidized bed carbon dioxide adsorption section 401 and heating means may be placed in the diluted fluidized bed carbon dioxide desorption section 402. Preheating or precooling means may be further provided to preheat or precool the carbon dioxide adsorbent. At least one compressor or blower may be further provided to move the carbon dioxide adsorbent.

The retention time of the adsorbents in the carbon dioxide adsorption sections and desorption sections of the carbon dioxide capture system may be determined depending on the operating conditions of the system. This construction is advantageous when the adsorbents have high adsorption and desorption rates.

Figure 6:
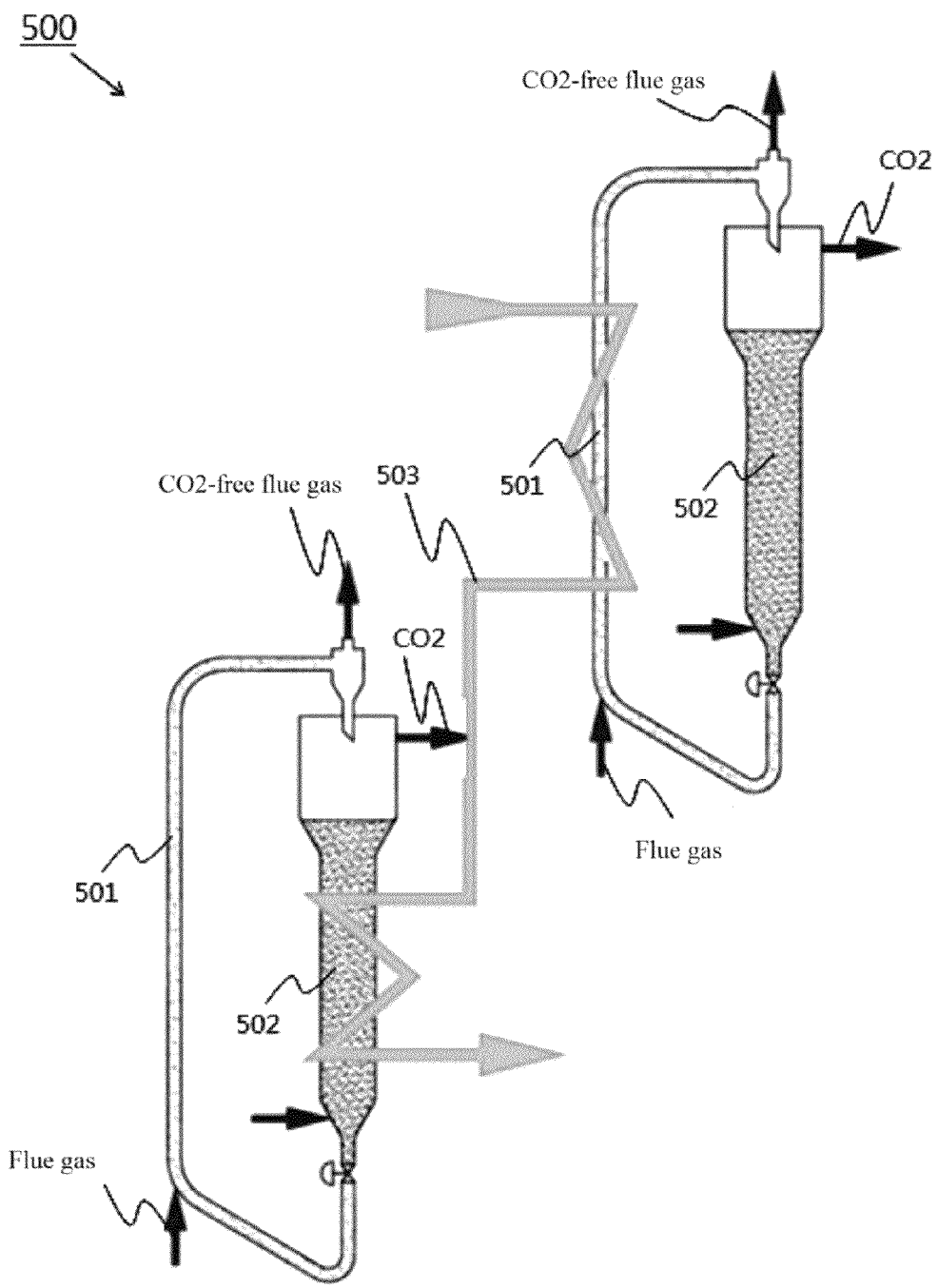
FIG. 6 is a diagram for explaining the concept of transferring heat of carbon dioxide adsorption to a region necessary for the desorption of carbon dioxide through a heat transfer medium in accordance with one embodiment of the present invention.
Figure 7:
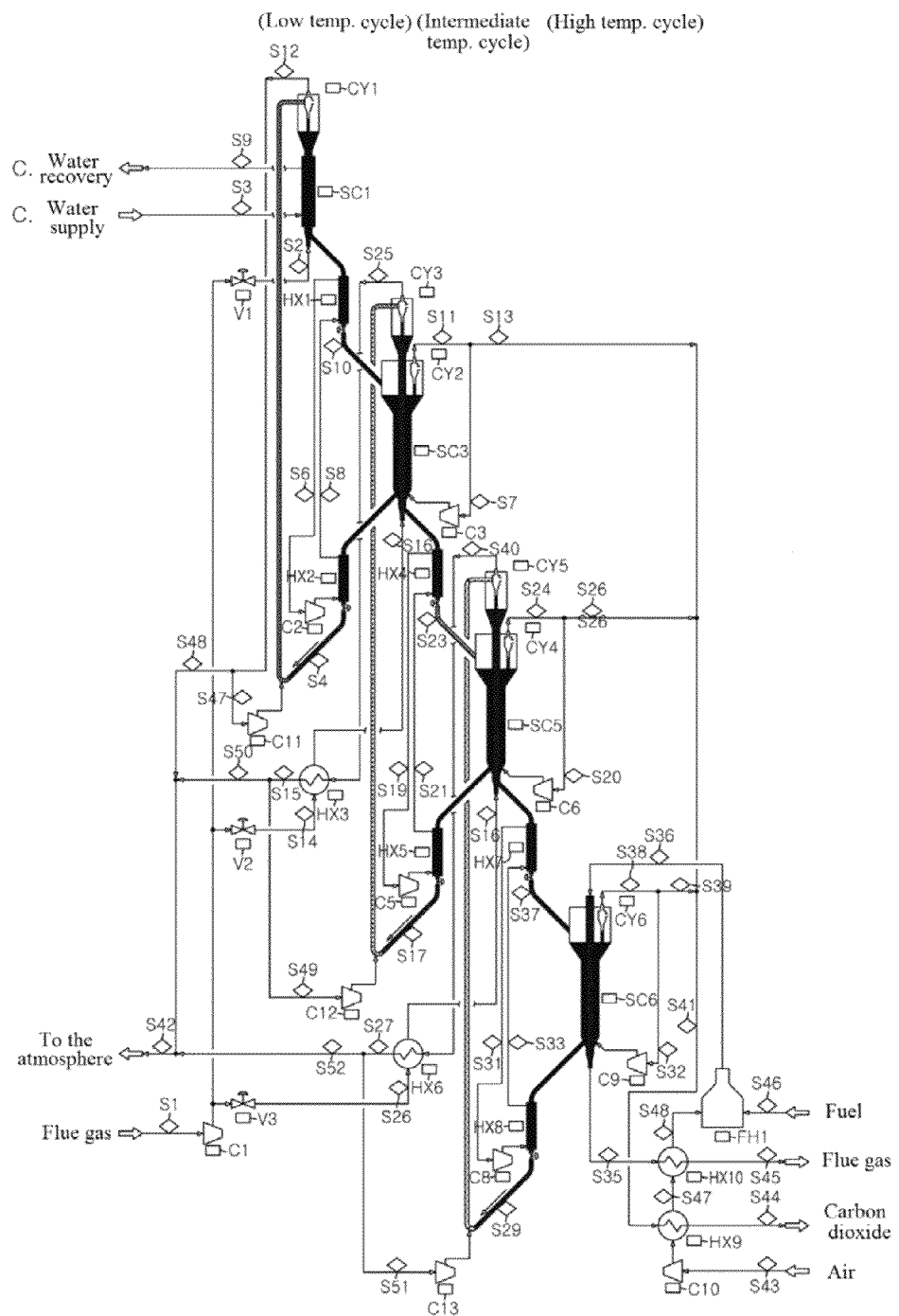
FIG. 7 illustrates a carbon dioxide capture system including bubbling fluidized bed adsorption columns and bubbling fluidized bed desorption columns according to one embodiment of the present invention.
Figure 8:
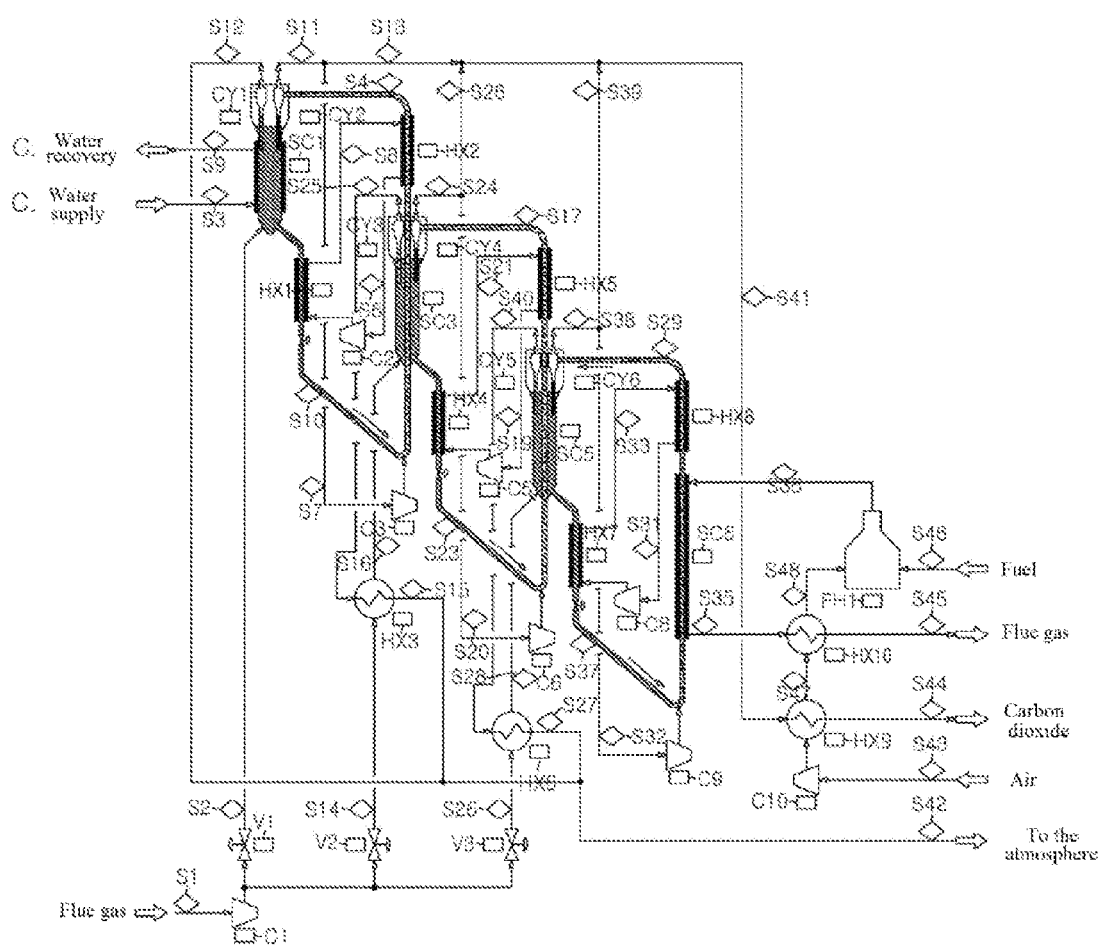
FIG. 8 illustrates a carbon dioxide capture system including bubbling fluidized bed adsorption columns and diluted fluidized bed desorption columns according to one embodiment of the present invention.
Figure 9:
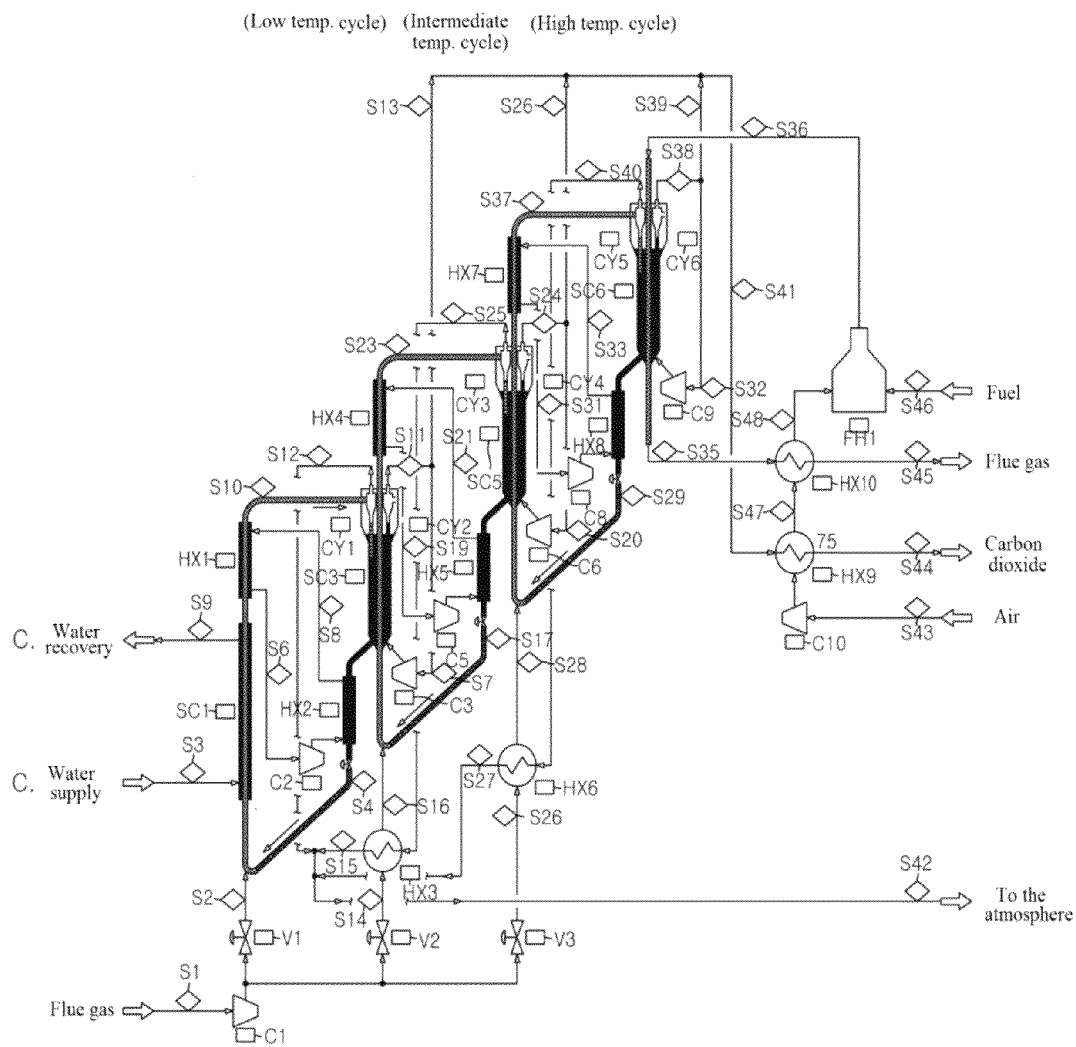
FIG. 9 illustrates a carbon dioxide capture system including diluted fluidized bed adsorption columns and bubbling fluidized bed desorption columns according to one embodiment of the present invention.
Figure 10:
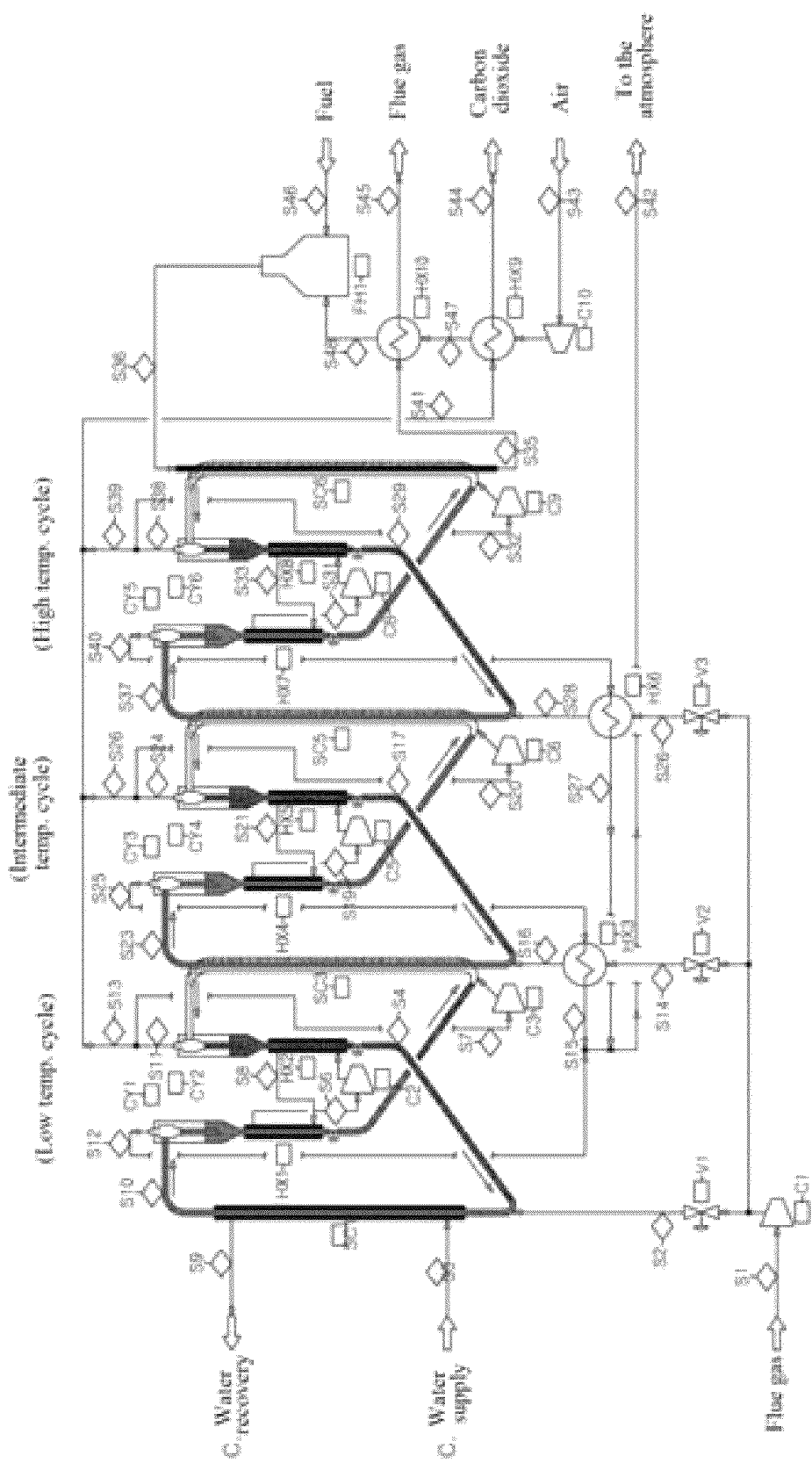
FIG. 10 illustrates a carbon dioxide capture system including diluted fluidized bed adsorption columns and diluted fluidized bed desorption columns according to one embodiment of the present invention.

FIG. 6 is a diagram for explaining the concept of transferring heat of carbon dioxide adsorption to a region necessary for the desorption of carbon dioxide through a heat transfer medium in accordance with one embodiment of the present invention. Referring to FIG. 6, the carbon dioxide capture system 500 includes diluted fluidized bed carbon dioxide adsorption sections 501, bubbling fluidized bed carbon dioxide desorption sections 502, and a heat transfer medium 503. The heat transfer medium 503 connects the carbon dioxide adsorption section 501 to the bubbling fluidized bed carbon dioxide desorption section 502 and functions as a medium to transfer heat of carbon dioxide adsorption to the desorption section. The transfer of heat through the heat transfer medium enables free design of the parts of the system, thus being advantageous in simplifying or scaling-up the construction of the system. The heat transfer medium is composed of a material having a high thermal conductivity. The system may include heat insulating means surrounding the outer surface thereof. The heat insulating means may be, for example, a heat insulating water jacket or silicone oil jacket. The carbon dioxide capture system of FIG. 6 including the diluted fluidized bed carbon dioxide adsorption sections and the bubbling fluidized bed carbon dioxide desorption sections is exemplified for ease of explanation. The heat transfer medium may also be applied to other carbon dioxide capture systems.

A detailed description will be given concerning the constructions and operations of the carbon dioxide capture systems with reference to FIGS. 7 to 11. These figures explain the embodiments of the present invention and some of the parts may be omitted or modified depending on the characteristics of the carbon dioxide adsorbents and the operating conditions of the systems.

FIGS. 7 to 10 illustrate the carbon dioxide capture systems according to the embodiments of the present invention. The carbon dioxide adsorption/desorption sections of the carbon dioxide capture systems have a combination of bubbling fluidized bed adsorption columns and bubbling fluidized bed desorption columns, a combination of bubbling fluidized bed adsorption columns and diluted fluidized bed desorption columns, a combination of diluted fluidized bed adsorption columns and bubbling fluidized bed desorption columns, or a combination of diluted fluidized bed adsorption columns and diluted fluidized bed desorption columns in a direct heat exchange mode. The carbon dioxide capture systems of FIGS. 7 to 10 are different from each other in the construction and connection of the carbon dioxide adsorption columns and the carbon dioxide desorption columns. The differences have been described in FIGS. 2 to 5 and a repeated explanation thereof is omitted. Hereinafter, an explanation will be given concerning the constitutions necessary for understanding the feeding of flue gases, the release of carbon dioxide, and the movement of carbon dioxide adsorbents. Referring to FIGS. 7 to 10, each of the carbon dioxide capture systems includes carbon dioxide adsorption/desorption sections, cyclones, adsorbent transfer lines, heat exchangers, fluid circulators, heaters, and flow regulating valves. A flue gas containing carbon dioxide is supplied through a compressor or ventilator as the fluid circulator C1 and is supplied to and distributed in the adsorption columns in the respective temperature regions by means of the flow regulating valves V1, V2 and V3. Flue gases in the respective temperature regions are heated to optimum temperatures for carbon dioxide adsorption and are introduced into the adsorption columns through the heat exchangers HX3 and HX6. Since the adsorbents in the low, intermediate, and high temperature regions have higher desorption temperatures than the carbon dioxide adsorption temperatures, the temperature differences may cause the problem of low heat efficiency during repeated adsorption-desorption cycles. This problem is solved by heating the adsorbents after carbon dioxide adsorption before the adsorbents are fed into the desorption columns and by cooling the adsorbents after carbon dioxide desorption before the adsorbents are fed into the adsorption columns. For the preheating and precooling, the heat exchangers HX1, HX2, HX4, HX5, HX7, and HX8 are provided between the adsorption columns and the desorption columns such that heat is exchanged in each stage. The fluid circulators C2, C5, and C8 are placed for smooth heat exchange during circulation of heat transfer media through the heat exchangers. That is, the adsorbents after adsorption are heated before being fed into the desorption columns and the adsorbents after desorption are cooled before being fed into the adsorption columns. The preheating and precooling minimize the amount of heat necessary for adsorption and desorption. For transfer of the adsorbents, the adsorbents having passed through stream numbers S4, S17, and S29 are fed into the cyclones CY1, CY3, and CY5 through the transfer lines (S4→CY1, S17→CY3, and S29→CY5). The carbon dioxide adsorption/desorption sections SC3, SC5, and SC6 are installed in the low, intermediate and high temperature regions, respectively, for direct heat exchange through the wall surfaces of the reactors. The cyclones CY1, CY2, CY3, CY4, CY5, and CY6 are disposed to separate the adsorbents from gases released from the carbon dioxide adsorption/desorption sections. The heater FH1 is placed to receive energy necessary for desorption of the adsorbent in the high temperature region from the outside. The heat exchangers HX9 and HX10 are placed to exchange heat between concentrated carbon dioxide escaping from the desorption columns and a flue gas from a heating furnace. This heat exchange minimizes the supply of energy.

Figure 11:
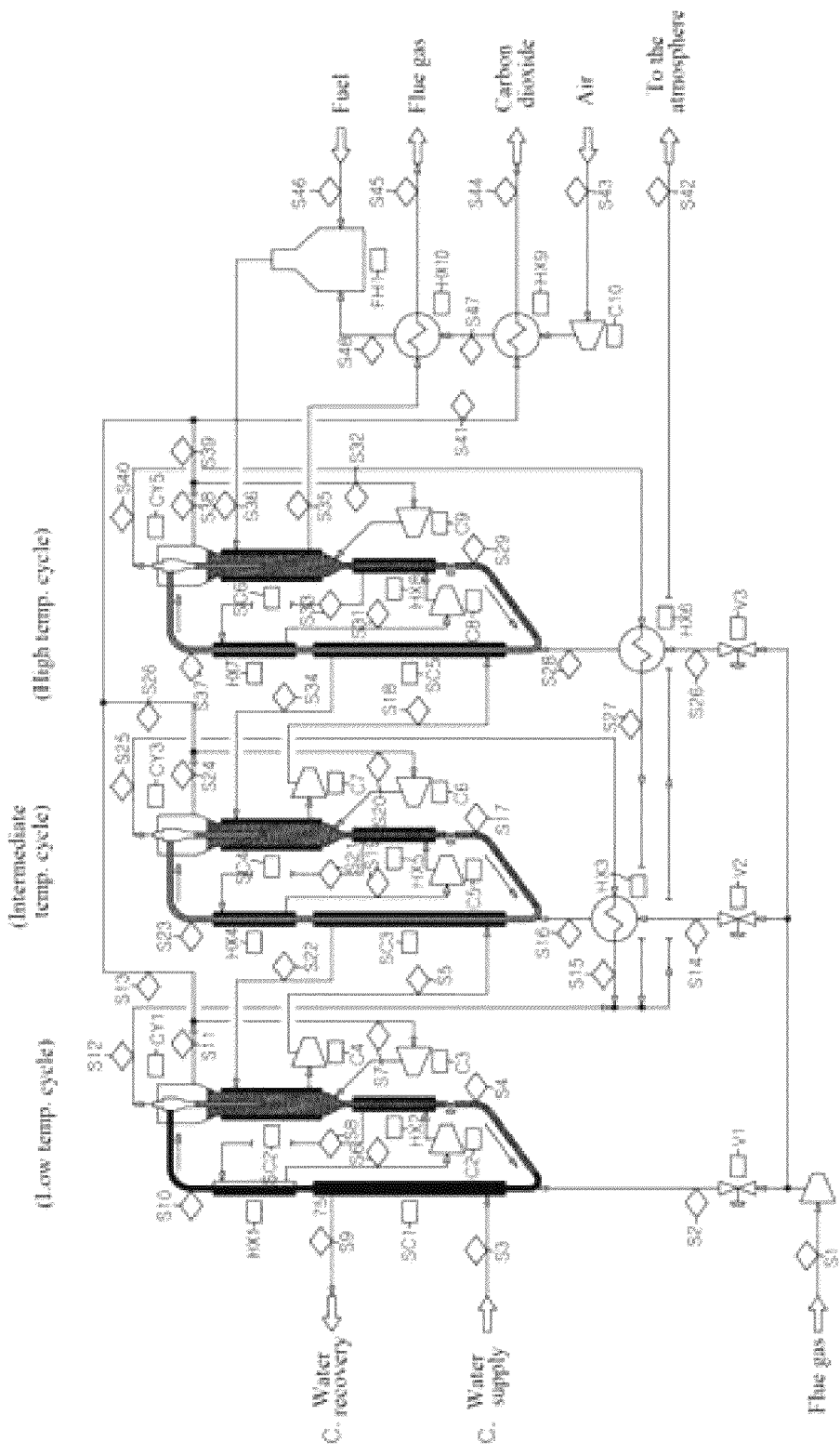
FIG. 11 illustrates a carbon dioxide capture system using heat transfer media according to one embodiment of the present invention.

FIG. 11 illustrates a carbon dioxide capture system using heat transfer media according to one embodiment of the present invention. Referring to FIG. 11, most of the parts of the system are the same as those explained in FIGS. 7 to 10. The system of FIG. 11 is distinguished from the systems of FIGS. 7 to 10 in the constitution associated with the use of the heat transfer media. Specifically, the system of FIG. 11 further includes heat exchangers and fluid circulators C4 and C7 to exchange heat of carbon dioxide adsorption and heat of carbon dioxide desorption through the heat transfer media.

Although the technical spirit of the present invention has been described with reference to the foregoing embodiments, those skilled in the art will appreciate that various variations and modifications are possible without departing from the essential features of the present invention. Therefore, the embodiments are merely illustrative and are not to be considered as limiting the technical spirit of the present invention. The scope of the invention is defined by the appended claims and all technical spirit within the range of equivalency of the claims should be construed as falling within the scope of the invention.

The invention claimed is:

1. A carbon dioxide capture system for selective separation of carbon dioxide from flue gases, comprising:
a first carbon dioxide adsorption/desorption section including a first carbon dioxide adsorption section, a first carbon dioxide desorption section connected to the first carbon dioxide adsorption section, and a first carbon dioxide adsorbent circulating through the first carbon dioxide adsorption section and the first carbon dioxide desorption section; and
a second carbon dioxide adsorption/desorption section including a second carbon dioxide adsorption section, a second carbon dioxide desorption section connected to the second carbon dioxide adsorption section, and a second carbon dioxide adsorbent circulating through the second carbon dioxide adsorption section and the second carbon dioxide desorption section,
wherein the first carbon dioxide adsorbent has higher adsorption and desorption temperatures than the second carbon dioxide adsorbent, the first carbon dioxide adsorption section is connected to the second carbon dioxide desorption section, and adsorption heat generated from the first carbon dioxide adsorption section is transferred to the second carbon dioxide desorption section and is used for the desorption of carbon dioxide.

2. The carbon dioxide capture system according to claim 1, wherein the first carbon dioxide adsorption section is connected to the second carbon dioxide desorption section in such a manner that the first carbon dioxide adsorption section penetrates the second carbon dioxide desorption section or the second carbon dioxide desorption section penetrates the first carbon dioxide adsorption section.

3. The carbon dioxide capture system according to claim 1, wherein the first carbon dioxide adsorption section is connected to the second carbon dioxide desorption section through a heat transfer medium.

4. The carbon dioxide capture system according to claim 1, wherein the first carbon dioxide desorption section is designed such that the first carbon dioxide desorption section is filled with 0.1 to 10% by volume of the first carbon dioxide adsorbent.

5. The carbon dioxide capture system according to claim 1, wherein the first carbon dioxide desorption section is designed such that the first carbon dioxide desorption section is filled with 10 to 80% by volume of the first carbon dioxide adsorbent.

6. The carbon dioxide capture system according to claim 1, wherein the second carbon dioxide adsorption section is designed such that the second carbon dioxide adsorption section is filled with 0.1 to 10% by volume of the second carbon dioxide adsorbent.

7. The carbon dioxide capture system according to claim 1, wherein the second carbon dioxide adsorption section is designed such that the second carbon dioxide adsorption section is filled with 10 to 80% by volume of the second carbon dioxide adsorbent.

8. A carbon dioxide capture system for selective separation of carbon dioxide from flue gases, comprising a plurality of carbon dioxide adsorption/desorption sections in which carbon dioxide adsorbents are filled and carbon dioxide is continuously adsorbed and desorbed while the carbon dioxide adsorbents circulate through carbon dioxide adsorption and desorption regions,
wherein the carbon dioxide adsorbent filled in at least one of the carbon dioxide adsorption/desorption sections has higher carbon dioxide adsorption and desorption temperatures than the carbon dioxide adsorbent filled in the adjacent adsorption/desorption section, and adsorption heat generated from the adsorption region of the carbon dioxide adsorption/desorption section filled with the carbon dioxide adsorbent having higher carbon dioxide adsorption and desorption temperatures is transferred to the desorption region of the adsorption/desorption section filled with the carbon dioxide adsorbent having lower carbon dioxide adsorption and desorption temperatures and is used for the desorption of carbon dioxide.

9. The carbon dioxide capture system according to claim 8, wherein adsorption heat generated from the adsorption region of the carbon dioxide adsorption/desorption section filled with the carbon dioxide adsorbent having higher carbon dioxide adsorption and desorption temperatures is transferred to the desorption region of the adsorption/desorption section filled with the carbon dioxide adsorbent having lower carbon dioxide adsorption and desorption temperatures in such a manner that the carbon dioxide adsorption region comes into direct contact with the carbon dioxide desorption region.

10. The carbon dioxide capture system according to claim 8, wherein adsorption heat generated from the adsorption region of the carbon dioxide adsorption/desorption section filled with the carbon dioxide adsorbent having higher carbon dioxide adsorption and desorption temperatures is transferred to the desorption region of the adsorption/desorption section filled with the carbon dioxide adsorbent having lower carbon dioxide adsorption and desorption temperatures through a heat transfer medium.

11. The carbon dioxide capture system according to claim 8, wherein adsorption heat generated from the adsorption region of the carbon dioxide adsorption/desorption section filled with the carbon dioxide adsorbent having higher carbon dioxide adsorption and desorption temperatures is transferred to the desorption region of the adsorption/desorption section filled with the carbon dioxide adsorbent having lower carbon dioxide adsorption and desorption temperatures through a heat exchanger.

12. The carbon dioxide capture system according to claim 8, wherein the plurality of carbon dioxide adsorption/desorption sections are divided into a high temperature carbon dioxide adsorption/desorption section, an intermediate temperature carbon dioxide adsorption/desorption section, and a low temperature carbon dioxide adsorption/desorption section; adsorption heat generated from a carbon dioxide adsorption region of the high temperature carbon dioxide adsorption/desorption section is transferred to a carbon dioxide desorption region of the intermediate temperature carbon dioxide adsorption/desorption section; and adsorption heat generated from a carbon dioxide adsorption region of the intermediate temperature carbon dioxide adsorption/desorption section is transferred to a carbon dioxide desorption region of the low temperature carbon dioxide adsorption/desorption section.

13. A carbon dioxide capture system comprising a plurality of carbon dioxide adsorption/desorption sections, each of which comprises: a bubbling fluidized bed adsorption column in which a carbon dioxide adsorbent is moved from the top to the bottom; a bubbling fluidized bed desorption column in which a carbon dioxide adsorbent is moved from the top to the bottom; a first connection line connecting the bottom of the bubbling fluidized bed adsorption column to the top of the bubbling fluidized bed desorption column; a second connection line connecting the bottom of the bubbling fluidized bed desorption column to the top of the bubbling fluidized bed adsorption column; and a cyclone disposed between the second connection line and the bubbling fluidized bed adsorption column, wherein at least one of the plurality of carbon dioxide adsorption/desorption sections is constructed such that heat is exchangeable.

14. A carbon dioxide capture system comprising a plurality of carbon dioxide adsorption/desorption sections, each of which comprises: a bubbling fluidized bed adsorption column in which a carbon dioxide adsorbent is moved from the top to the bottom; a diluted fluidized bed desorption column in which a carbon dioxide adsorbent is moved from the bottom to the top; and a cyclone disposed between the bubbling fluidized bed adsorption column and the diluted fluidized bed desorption column, wherein at least one of the plurality of carbon dioxide adsorption/desorption sections is constructed such that heat is exchangeable.

15. A carbon dioxide capture system comprising a plurality of carbon dioxide adsorption/desorption sections, each of which comprises: a diluted fluidized bed adsorption column in which a carbon dioxide adsorbent is moved from the bottom to the top; a bubbling fluidized bed desorption column in which a carbon dioxide adsorbent is moved from the top to the bottom; and a cyclone disposed between the diluted fluidized bed adsorption column and the bubbling fluidized bed desorption column, wherein at least one of the plurality of carbon dioxide adsorption/desorption sections is constructed such that heat is exchangeable.

16. A carbon dioxide capture system comprising a plurality of carbon dioxide adsorption/desorption sections, each of which comprises: a diluted fluidized bed adsorption column in which a carbon dioxide adsorbent is moved from the bottom to the top; a diluted fluidized bed desorption column in which a carbon dioxide adsorbent is moved from the bottom to the top; two storage columns connecting the diluted fluidized bed adsorption column to the diluted fluidized bed desorption column; a cyclone disposed between the diluted fluidized bed adsorption column and one of the storage columns; and a cyclone disposed between the diluted fluidized bed desorption column and the other storage column, wherein at least one of the plurality of carbon dioxide adsorption/desorption sections is constructed such that heat is exchangeable.

17. A carbon dioxide capture method for selective separation of carbon dioxide from flue gases
wherein carbon dioxide adsorbents are filled in a plurality of carbon dioxide adsorption/desorption sections,
carbon dioxide is continuously adsorbed and desorbed while the carbon dioxide adsorbents circulate through carbon dioxide adsorption and desorption regions of the carbon dioxide adsorption/desorption sections,
the carbon dioxide adsorbent filled in at least one of the carbon dioxide adsorption/desorption sections has higher carbon dioxide adsorption and desorption temperatures than the carbon dioxide adsorbent filled in the adjacent adsorption/desorption section, and
adsorption heat generated from the adsorption region of the carbon dioxide adsorption/desorption section filled with the carbon dioxide adsorbent having higher carbon dioxide adsorption and desorption temperatures is transferred to the desorption region of the adsorption/desorption section filled with the carbon dioxide adsorbent having lower carbon dioxide adsorption and desorption temperatures and is used for the desorption of carbon dioxide.

\* \* \* \* \*